April 7, 1953  R. G. CUDINI  2,633,762
DRILLING MACHINE
Filed Nov. 4, 1949  3 Sheets-Sheet 1
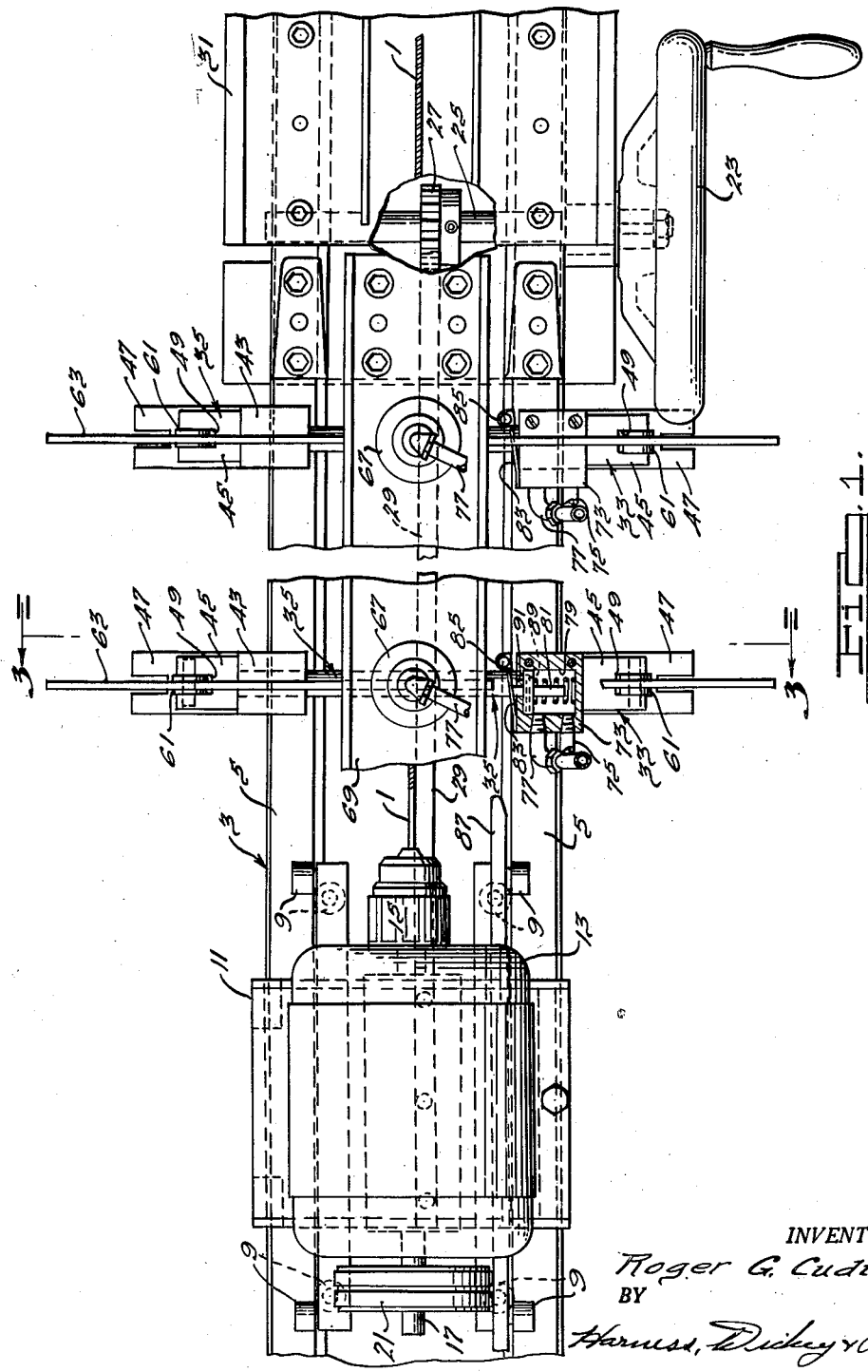
INVENTOR.
Roger G. Cudini
BY
Harness, Dickey & Pierce
ATTORNEYS.

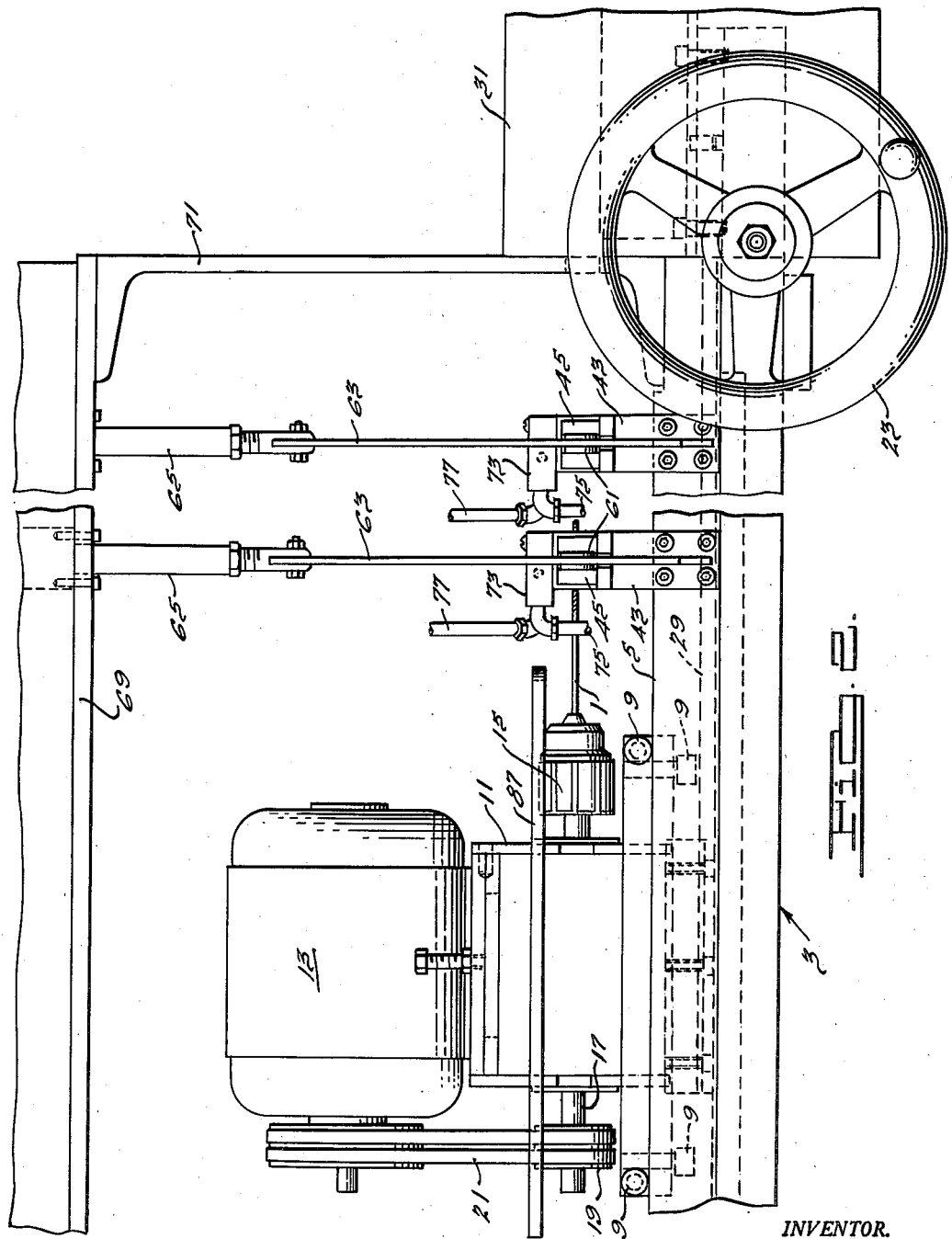

April 7, 1953 R. G. CUDINI 2,633,762
DRILLING MACHINE
Filed Nov. 4, 1949 3 Sheets-Sheet 3
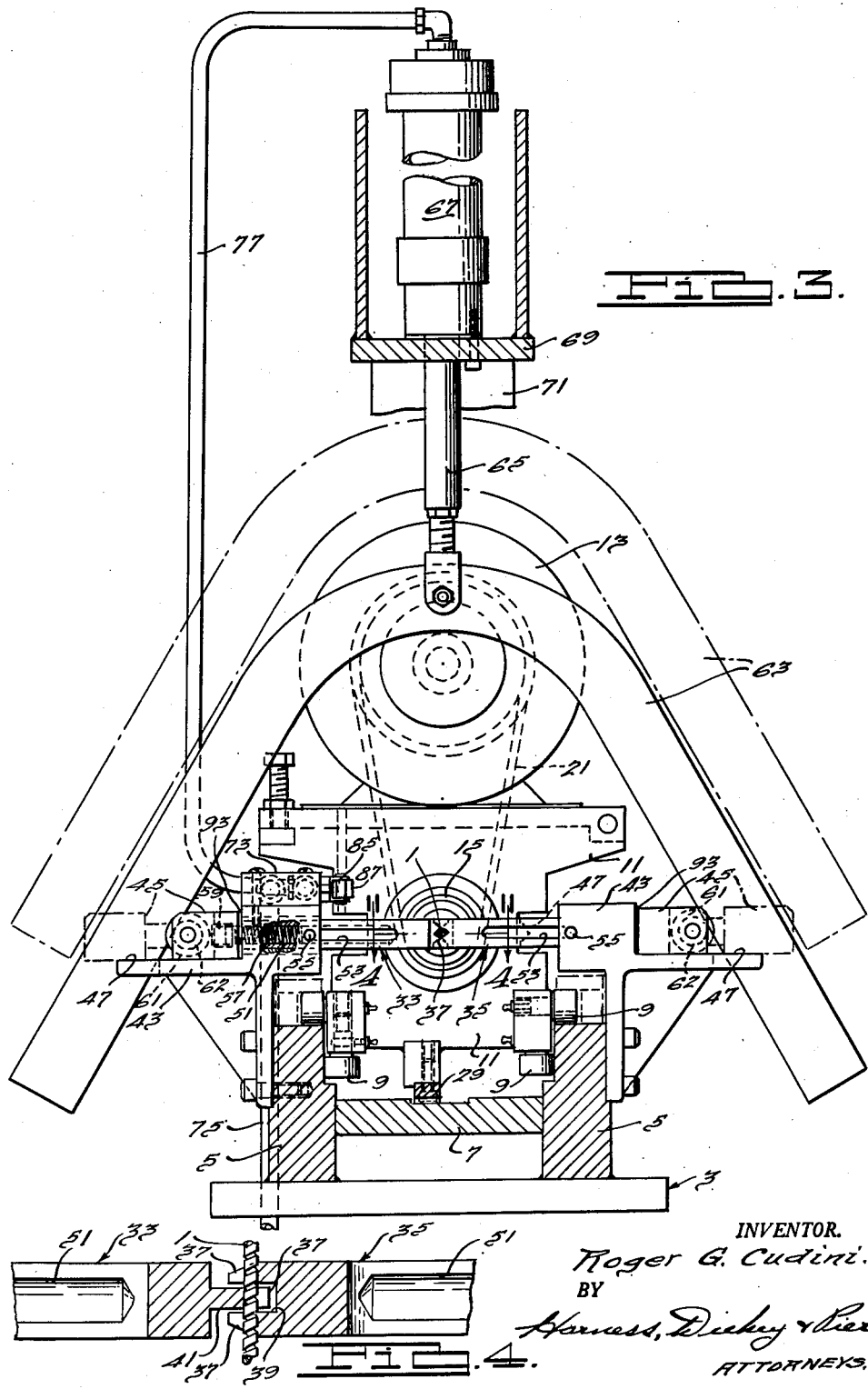
INVENTOR.
Roger G. Cudini.
BY
Harness, Dickey & Pierce
ATTORNEYS.

Patented Apr. 7, 1953

2,633,762

UNITED STATES PATENT OFFICE 2,633,762

DRILLING MACHINE

Roger G. Cudini, Birmingham, Mich., assignor to Moynahan Bronze Company, Detroit, Mich., a corporation of Michigan Application November 4, 1949, Serial No. 125,603

7 Claims. (Cl. 77—5)

This invention relates to drilling machines and, in particular, to drilling machines that are adapted to drill holes of such considerable length as compared with the diameter of the hole that the drilling tool is subjected to excessive lateral deflection. A machine of this type is described in a copending application, Serial No. 114,034, of the present inventor, entitled Deep Drilling Machine, filed September 3, 1949, now abandoned.

With reference to drilling machines of the type indicated, it is an object of the invention to provide support elements that will prevent excessive lateral deflection of the drilling tool.

This and other objects of the invention are accomplished by a construction in which the support elements are in the form of plungers that are adapted at their ends to support the drilling tool, and which reciprocate into and out of the paths of the drilling tool and its feed and drive carriage. Pressure-operated means are provided to energize movement of the plungers. This means is under the control of a suitable valve arrangement which is automatically actuated by the carriage during feed movement thereof to move the plungers out of operative position wherein they support the drilling tool and out of the path of the carriage.

The invention is illustrated in the accompanying drawings, wherein:

Figure 1 is a plan view of the improved drilling machine with parts broken away;

Fig. 2 is a side elevation of the structure shown in Fig. 1;

Fig. 3 is a cross section taken on line 3—3 of Fig. 1; and

Fig. 4 is a cross section taken on line 4—4 of Fig. 3.

The drilling machine illustrated is of the horizontal type so that the drilling tool 1 is subject to downward deflection under the load of its own weight. The machine is provided with a support structure or frame 3 of any suitable construction which includes laterally spaced uprights 5 extending lengthwise of the machine that are interconnected in an intermediate horizontal plane by a cross plate 7. The top and upper inside surfaces of the uprights 5 form tracks that engage and support rollers 9 that are suitably secured to the lower portions of a carriage 11. The carriage 11, as well as frame 3, may be of welded plate or other suitable construction and carries and supports a motor 13 for energizing the drill 1. The drill 1 is held by a drill chuck 15 that is drivably affixed to a shaft 17 that is rotatably mounted in a suitable manner on the carriage 11 and which carries pulleys 19 so that it may be driven by the motor 13 through the medium of belts 21. The carriage 11 is itself moved lengthwise of the frame 3 on the tracks 5, so as to effect axial feed movement of the drill 1, by means of a handwheel 23 on the frame at the workpiece end thereof. The handwheel 23 has a shaft 25 journaled in the frame which carries a pinion 27 that drivingly engages a rack bar 29 that is secured to the bottom of the carriage 11 and extends lengthwise beyond the end thereof to the handwheel when the carriage is in fully retracted position. The rack bar 29 is slidably supported on the cross plate 7 which terminates before reaching the shaft 25 so as to permit driving engagement of the pinion 27 with the rack.

The workpiece to be drilled may be supported on a suitable frame 31 located at the end of the frame 3, the details of the work support forming no part of the present invention.

In order to support the drill 1 when the carriage 11 is in rather remote positions from frame 31, so that a substantial length of drill is not supported by the workpiece itself, the invention provides a series of axially spaced pairs of horizontal, laterally reciprocable plungers, each pair comprising a plunger 33 and a plunger 35 which are identical except for their innermost ends. As indicated in Figs. 3 and 4, the innermost ends of both plungers are provided with end-opening V notches 37. Plunger 35, however, is slotted or bifurcated at 39 and this opening receives the projecting end 41 of the plunger 33. The surfaces of the V notches 37 thus close upon and surround the drill 1 to support it in the desired manner.

The plungers 33 and 35 are slidably supported in suitably bushed apertures provided in brackets 43 that are affixed to the uprights 5 in such a manner that the bodies thereof do not interfere with the rollers 9. The plungers 33 and 35 each have enlarged heads 45 at their outermost ends which slide on the surfaces of horizontal ledges 47 provided by the brackets 43. The heads 45 are longitudinally slotted, as shown at 49 (Fig. 1), and through the base of this slot is drilled an interior bore 51 in the plunger stems. Longitudinally extending registering slots 53 are also formed in opposite side walls of each plunger in that portion thereof which slides through the bracket 43. A cross pin 55 fits in suitable apertures in the bracket 43 and extends through the slots 53 in each plunger. The pin 55 serves as a fixed reaction member for a coil spring 57 which is placed in each bore 51 and held therein by a cap 59 that is threaded into head 45 at the base of slot 49. The confinement of springs 57 is such that they constantly urge the plungers 33 and 35 outwardly out of the path of the drill 1 and carriage 11 to the dotted line position of Fig. 3.

Despite the outwardly directed force on the plungers provided by the springs 57, they are normally in their innermost or drill-supporting position during operation of the present machine. Pressure-actuated cam means are provided to overcome the spring forces and hold the plungers in this position. This means includes rollers 61 that are rotatably mounted on the walls of slots 49 in the plunger heads 45. The rollers 61 for each pair of plungers 33 and 35 are grooved at 62 to receive and be engaged by a common, generally horse-shoe or U-shaped cam bar 63 that extends over the frame 3. Each cam bar is attached at a central portion to the vertical plunger 65 of an air cylinder 67. The air cylinders 67 are fixedly mounted above the frame 3 and carriage 11 and motor 13 upon a horizontal plate 69 which is held in position by uprights 71 secured to the frame 3. It is evident that when a pressure cylinder 67 is suitably actuated the cam bar 63 will be moved to a position above the motor 13 and carriage 11, and the plungers 33 and 35 will be forced outwardly out of the path of the carriage 11, as previously described.

Each air cylinder 67 is under the control of a valve 73 that is mounted atop the bracket 43 on one side of the frame 3. The valves 73 receive air from a common manifold through the inlet conduits 75 and are connected to the tops of the cylinders 67 through conduits 77. The valves are of a commercial type which normally allow the conduits 75 to be in communication with the conduits 77, thus placing pressure on the tops of the cylinders 67 to force the plungers 65 and cam bars 63 downwardly, whereby the plungers 33 and 35 are held in drill-supporting position.

A suitable valve construction for providing this form of control comprises a valve body having a chamber 79 into which both conduits 75 and 77 open. A valve plunger 81 is spring-pressed beyond the opening of conduit 77 and has a land adapted to close this opening when suitable force is applied thereto. The end of the plunger 81 extends outside of the valve 73 and is borne upon by a leaf spring element 83 that carries a cam follower element, such as a roller 85, that extends into the path of a longitudinal cam bar 87 on the side of the carriage 11.

The cam bar 87 extends beyond each end of the carriage 11. As long as it is in engagement with the follower 85 of any particular valve 73, that valve is operated to allow its cam bar 63 to be lifted and its pair of followers 33 and 35 to be withdrawn from the path of the carriage 11. This takes place because the land of valve plunger 81 is forced to cover the opening of conduit 77 into chamber 79, thus cutting off its communication with pressure in line 75. Air in the cylinder and conduit 77 is allowed to escape through a radial passage 89 in the plunger land that opens into the face of the land remote from conduit 75, and thus communicates with an outlet hole 91 for the chamber 79. The pressure of a spring in the cylinder 67, or the pressure of springs 57, is then able to lift the cam bar 63 and pull it and plungers 33 and 35 out of the path of the carriage. After the carriage has passed a sufficient distance so that the cam bar 87 passes off the follower 85, the valve 73 will be released to allow pressure to reach the top of cylinder 67 and force the plungers 33 and 35 back to the full line position illustrated in the drawings.

As evident from Fig. 3, the extent of inward movement of the plungers 33 and 35 is limited by abutment of the vertical inside faces of the plunger heads 45 with the bracket 43. The plungers are so proportioned that when this occurs the cooperating notches 37 provide an opening suitable for the minimum size drill to be supported. When larger drills are to be supported, shims 93 are placed between the faces of the plunger heads 45 and bracket 43 to shorten the inward movement of the plungers and thus increase the diameter of the opening provided by notches 37.

Modifications may obviously be made in the specific structure described without departing from the spirit of the invention.

I claim:

1. In a drilling machine, the combination of frame means providing a stationary track, a carriage structure adapted to hold a drill mounted on the track for reciprocatory movement, a pair of reciprocatory plungers mounted on the frame on opposite sides of the track and movable until the inner ends thereof are in the path of a drill on the carriage, means on the ends of the plungers for supporting a drill, spring means urging the plungers to a position wherein the ends thereof are out of the part of a carriage moving on the track, cam means engaging portions of the plungers for forcing the inner ends of the plungers into the path of a drill, pressure actuated means for moving the cam means, a valve for controlling the pressure actuated means, and means on the carriage for engaging and operating the valve to thereby actuate the pressure actuated means to move the cam means so that the spring means may force the plungers outwardly out of the path of a drill and carriage.

2. In a drilling machine, the combination of frame means providing a stationary track, a carriage structure adapted to hold a drill mounted on the track for reciprocatory movement, a pair of reciprocatory plungers mounted on the frame on opposite sides of the track and movable until the inner ends thereof are in the path of a drill on the carriage, means on the ends of the plungers for supporting a drill, spring means urging the plungers to a position wherein the ends thereof are out of the path of a carriage moving on the track, cam means engaging portions of the plungers for forcing the inner ends of the plungers into the path of a drill, pressure actuated means for moving the cam means, a valve for controlling the pressure actuated means, a cam member on the carriage, said valve having an actuator extending into the path of the cam member and adapted to be moved thereby to actuate the pressure actuated means to permit movement of the plungers out of the path of the carriage.

3. In a drilling machine, the combination of frame means providing a stationary track, a carriage structure mounted on the track for reciprocatory movement, a pair of reciprocatory plungers mounted on the frame on opposite sides of the track and movable to an operative position wherein the inner ends thereof are in the path of the carriage, means on the ends of the plungers for supporting a drill when said plungers are in operative position, spring means urging the plungers to an inoperative position wherein the ends thereof are out of the path of a carriage moving on the track, a rebent cam bar extending over the track and having its ends operatively engaging the ends of the plungers so that movement of the cam bar along one axis results in movement of the plungers about an axis normal to the axis of movement of the cam bar, fluid pressure actuated means for moving and supporting the cam bar, a valve for controlling the fluid pressure actuated means, and means on the carriage for engaging and operating the valve to thereby actuate the pressure actuated means to move the cam bar so that the spring means may force the plungers outwardly to inoperative position out of the path of the carriage.

4. The invention as claimed in claim 1 wherein the means on the ends of the plungers comprises interfitting V notches.

5. In a machine wherein a drill member operates upon a workpiece member, the combination of a frame having a track, a feed carriage for one of said members mounted on said track for reciprocatory movement, a pair of cooperating drill supports mounted on the frame on opposite sides of the track and movable across the track into the path of said carriage, spring means urging said supports to move in one direction, a movable cam bar arched over said track having its ends operatively connected to said supports whereby movement of the cam bar in one direction moves said supports against the resistance of said spring means and movement of the cam bar in the other direction permits movement of the supports by said spring means, a fluid pressure cylinder mounted on the frame over said track and having a reciprocatory rod, said cam bar being attached to said rod for reciprocatory movement, a valve for controlling flow of fluid pressure to said cylinder and thus the direction of movement of said rod, and a valve operator mounted on the carriage for operative connection with said valve when the carriage is near the drill supports.

6. The invention of claim 5 wherein a plurality of longitudinally spaced pairs of drill supports are mounted on the frame and a plurality of longitudinally spaced cam bars, pressure cylinders, and valves are mounted on the frame to control movement of the drill supports.

7. In a drilling machine of the type described, a drill support including reciprocatory members mounted on opposite sides of the path of movement of the drill and movable until the inner ends of the members are in the path of a drill, the end of one member being bifurcated and the end of the other member fitting in said bifurcation when the members are in operative drill supporting position, the ends of said members having substantially V-shaped notches formed therein to engage the periphery of a drill supported thereby.

ROGER G. CUDINI.

REFERENCES CITED

The following references are of record in the file of this patent:

UNITED STATES PATENTS

| Number | Name | Date |
|---|---|---|
| 24,045 | Murphy | May 17, 1859 |
| 1,219,078 | Calahan | Mar. 13, 1917 |